United States Patent [19]

Brecher et al.

[11] Patent Number: 5,017,751

[45] Date of Patent: May 21, 1991

[54] INDUCTIVELY-COUPLED RF PLASMA TORCH

[75] Inventors: Charles Brecher, Lexington; Richard C. Assmus, Braintree; Jonathan S. Brecher, Lexington, all of Mass.

[73] Assignee: GTE Laboratories Incorporated, Waltham, Mass.

[21] Appl. No.: 541,576

[22] Filed: Jun. 21, 1990

[51] Int. Cl.[5] ................................................ B23K 9/00

[52] U.S. Cl. .......................... 219/121.52; 219/121.59; 219/121.48; 315/111.51

[58] Field of Search ...................... 219/121.52, 121.59, 219/75, 121.51, 121.48; 315/111.21, 111.51

[56] References Cited

U.S. PATENT DOCUMENTS

| | | | |
|---|---|---|---|
| 3,660,715 | 5/1972 | Post | 315/111.51 |
| 4,727,236 | 2/1988 | Hull et al. | 219/121.52 |
| 4,739,147 | 4/1988 | Meyer et al. | 219/121.52 |
| 4,766,287 | 8/1988 | Morrisroe et al. | 219/121.52 |
| 4,849,675 | 7/1989 | Muller | 315/111.51 |

OTHER PUBLICATIONS

T. Kameyama et al., *ISPC-8 Tokyo,* 1987, Paper No. P-159, pp. 2065-2070.

R. M. Young et al., *Plasma Chemistry and Plasma Processing,* 5 (1), 1985, pp. 1-37.

Toyonobu Yoshida et al., *J. Appl. Phys.* 54 (2), Feb. 1983, pp. 640-646.

*Primary Examiner*—M. H. Paschall

*Attorney, Agent, or Firm*—Frances P. Craig

[57] ABSTRACT

An inductively coupled RF plasma generator and method. The plasma generator includes a body having a conduit having a gas inlet and an outlet. Induction structure surrounding the conduit inductively excites the gas, generating a plasma which leaves the conduit outlet as a tail flame. An electrically insulating chimney is positioned at the outlet so that the chimney surrounds the tail flame and no electrical path to ground exists between the outlet and the chimney means. A grounded electrode is positioned downstream of the plasma and sufficiently near the outlet to provide an electrical path to ground from the tail flame shorter than other available paths to ground. The method for generating a plasma utilizing the inductively coupled RF plasma generator involves inductively exciting the gas to generate a plasma which leaves the outlet as a tail flame. The tail flame is surrounded by a chimney so that no path to ground exists between the outlet and the chimney. A preferred path to ground is provided by an electrode which attracts the tail flame, preventing unwanted arcing and increasing the efficiency of the torch.

7 Claims, 2 Drawing Sheets

INDUCTIVELY-COUPLED RF PLASMA TORCH

BACKGROUND OF THE INVENTION

This invention relates to apparatus and method for plasma processing, and in particular to an inductively coupled thermal plasma generator.

Plasma processing is well known in the art, and is currently used in industrial and material processing applications. Plasma torches of various types are described by R. M. Young et al. (*Plasma Chemistry and Plasma Processing,* 5, 1-37 (1985)), incorporated herein by reference. Thermal plasma is usually generated by one of two standard techniques. The most commonly used method involves the generation of a DC (direct current) arc between appropriately designed electrodes that are bathed in a flowing carrier gas medium. The arc heats the flowing gas, which is then expelled at high velocity from the torch nozzle. The resulting flame can reach temperatures as high as 10,000° C.-20,000° C. The device may be used for many materials processing applications, such as plasma spray coating of various substrates with corrosion resistant, hard surfacing, or thermal barrier layers, as well as spheroidization of refractory powder particles.

A second plasma generating method involves inductive RF (radio frequency) coupling. This technique needs no electrodes in direct contact with the flowing gas. Instead, the tube through which the gas is flowing is surrounded by an inductive coil carrying an RF current, and power is coupled into the hot conductive gas, in a manner somewhat similar to the techniques used in inductively coupled arc lamps. The frequencies used run in the range of fractions to tens of megahertz. These devices are used for applications similar to those for which the DC torches are used, and have been found particularly suited to such applications as chemical synthesis of ceramic or metal powders.

Each method has its own unique advantages and drawbacks. In the DC torch, the arc is in direct contact with the gas, heating it more efficiently. However, the DC torch requires high velocity gas flow, produces high radial temperature gradients, and is subject to electrode erosion, particularly at the electron-emitting cathode. Also, penetration of the stream of hot gas by particles, e.g. in particle spheroidization applications, is relatively difficult to control, with the high viscosity of the rapidly flowing hot gas causing particles to be deflected by the stream.

Inductive coupling, on the other hand, allows greater radial uniformity of temperature, lower gas velocity, and easier and more reproducible particle penetration. Further, with no cathode to erode, there is less chance for product contamination, and reactive gases which would destroy the DC cathodes can be safely used to produce plasma in an inductively coupled torch. This opens new possibilities of producing plasmas from reactive, or even corrosive gases and gas mixtures. All of these advantages, however, are achieved at the expense of coupling efficiency. Most of the power is deposited not at the center line of the gas flow but near its outer periphery, the electrically conducting plasma then partially shielding the gas closer to the center. This typically gives a temperature distribution with some degree of a "hole" with the temperature being higher toward the outer circumference than near the center. Both coupling efficiency and uniformity are frequency-dependent; lowering the frequency allows the power to be deposited progressively closer to the center, but at the cost of a progressively higher power threshold required for plasma generation. This effectively prevents the use of higher-enthalpy gases, for example nitrogen or hydrogen, as the major plasma constituent at any but the highest power levels.

Within the past several years, a number of attempts have been made to combine the two techniques to form a "hybrid" system, enhancing some of the desired characteristics and/or minimizing some of the drawbacks. Typically in such applications, a lower power DC torch is used to generate a flame which is then passed through an inductive coil. This improves the temperature uniformity (effectively filling the thermal "hole" normally found in simple RF torches), while at the same time enabling better control of particulate/reactant input by allowing injection between the two stages. A typical hybrid system is described by Toyonobu Yoshida et al. (*J. Appl. Phys.,* 54, pp 640-646 (1983)). Alternatively, two stages of inductive coupling can be used, with similar results, as described by T. Kameyama et al. (ISPC-8, Tokyo, 1987, Paper No. P-159, pp 2065-2070). The Toyonobu Yoshida and T. Kameyama papers are both incorporated herein by reference.

However, under certain conditions, particularly at higher frequencies, a floating voltage may be generated in the plasma fireball and flame of systems involving RF plasma generation. This floating voltage appears to comprise mostly AC voltage with some DC component, and can involve voltages sufficiently high to produce arcing to conductive components of the torch, even across a gap of several feet, extinguishing the plasma flame. The origin of this anomalous voltage is not well understood, but may be related to the existence of a recirculation eddy within the torch. The floating voltage can often be somewhat controlled by operating at a lower frequency, but this requires a higher power input, often as much as an order of magnitude higher than that required at high frequency operation. Operating such systems at sufficiently high frequencies for efficient operation requires complete electrical isolation of the flame from other torch components, lest an electrical short develop between them, causing arc instability or extinction. In simple RF systems, this isolation can be relatively easy to achieve by designing a sufficiently large gap between the tail flame and any conducting structure surrounding the flame. However in hybrid systems, because of the requirement for dual generation, and in certain more complex RF systems, such isolation can involve complex design considerations focused on preventing generation of this voltage and/or providing the requisite degree of electrical isolation. Such approaches can impose limitations on device performance and/or operating frequency, and are not always successful.

It would be advantageous if, rather than directing efforts toward prevention or isolation of the anomalous voltage, a way could be found to utilize this voltage to improve energy efficiency and spatial temperature distribution. The present invention provides such a way.

SUMMARY OF THE INVENTION

An inductively coupled RF plasma generator according to one embodiment of the invention includes a body which includes a conduit for the passage of a gas through the body, the conduit having an inlet for introducing the gas to the conduit and an outlet. Induction means is associated with a plasma generating region of the conduit for inductively exciting the gas to generate a plasma from the gas. The plasma exits the conduit at the outlet as a tail flame. Electrically insulating chimney means has an open proximal end, positioned at the outlet such that the chimney surrounds the tail flame and no electrical path to ground exists between the outlet and the chimney means, and an open distal end. A grounded electrode is positioned downstream of the plasma generating region and sufficiently near to the outlet to provide an electrical path to ground from the tail flame which is shorter than other available paths to ground.

According to another embodiment of the invention, a device is provided for modifying an inductively coupled RF plasma generator. The RF plasma generator includes a body which includes a conduit for the passage of a gas through the body, the conduit having an inlet for introducing the gas to the conduit, and an outlet. The RF plasma generator also includes induction means associated with a plasma generating region of the conduit for inductively exciting the gas to generate a plasma from the gas. The plasma exits the conduit at the outlet as a tail flame. The device includes electrically insulating chimney means having an open proximal end positionable at the outlet such that the chimney surrounds the tail flame and no electrical path to ground exists between the outlet and the chimney means, and an open distal end. The device also includes a grounded electrode associated with the chimney means such that the grounded electrode is positionable downstream of the plasma generating region and sufficiently near to the outlet to provide an electrical path to ground from the tail flame which is shorter than other available paths to ground.

According to yet another embodiment of the invention, a method for generating a plasma utilizes an inductively coupled RF plasma generator including a body which includes a conduit for the passage of a gas through the body, the conduit having an inlet for introducing the gas to the conduit and an outlet. The RF plasma generator also includes induction means associated with a plasma generating region of the conduit for inductively exciting the gas to generate a plasma from the gas, the plasma exiting the conduit at the outlet as a tail flame. The method involves introducing a gas to the conduit at the inlet, and inductively exciting the gas within the conduit, by means of the induction coil, to generate a plasma from the gas. The plasma exits the conduit at the outlet as a tail flame. The tail flame is surrounded with an electrically insulating chimney means, such that no electrical path to ground exists between the outlet and the chimney means. The electrically insulating chimney means has an open proximal end and an open distal end. A grounded electrode is positioned downstream of the plasma generating region and sufficiently near to the outlet to provide an electrical path to ground which is shorter than other available paths to ground.

According to still another embodiment of the invention, a method is provided for modifying an inductively coupled RF plasma generator. The RF plasma generator includes a body which includes a conduit for the passage of a gas through the body, the conduit having an inlet for introducing the gas to the conduit and an outlet. The RF plasma generator also includes induction means associated with a plasma generating region of the conduit for inductively exciting the gas to generate a plasma from the gas. The plasma exits the conduit at the outlet as a tail flame. The method involves positioning an electrically insulating chimney means at the outlet to surround the tail flame, such that no electrical path to ground exists between the outlet and the chimney means. The electrically insulating chimney means has an open proximal end and an open distal end. A grounded electrode is positioned downstream of the plasma generating region and sufficiently near to the outlet to provide an electrical path to ground which is shorter than other available paths to ground.

BRIEF DESCRIPTION OF THE DRAWINGS

For a better understanding of the present invention, together with other objects, advantages and capabilities thereof, reference is made to the following Description and appended claims, together with the Drawings, in which:

FIG. 1 illustrates the effect of the strong anomalous voltage produced in an argon flame, while FIG. 2 illustrates this effect in a nitrogen flame.

DETAILED DESCRIPTION OF THE PREFERRED EMBODIMENTS

The present invention offers a different solution from those of the prior art to providing an efficient and effective plasma generation system. The following discussion is directed specifically to RF plasma torches. However, the present invention is also useful in hybrid systems including RF plasma generators. The term "plasma generator" as used throughout this specification and the accompanying claims is defined as any system in which a high velocity plasma jet is generated, for example a plasma torch, plasma accelerator, plasma engine, or plasma oscillator.

In one embodiment of the invention a prior art system is modified to utilize the anomalous floating voltage rather than attempting prevent or isolate it. The utilization of the anomalous voltage is achieved by positioning a grounded electrode directly downstream of the plasma fireball and sufficiently near the torch nozzle to offer the floating voltage a path to ground and thus "attract" the tail flame. The use of this grounded electrode increases the useable power, expressed as grid current, extracted from the RF generator at a given input voltage, improving the efficiency of the torch. The grounded electrode preferably is also positioned to direct this power toward the center line of the flame where the RF coupling in prior art systems is least effective, eliminating the "hole" in the temperature distribution without lowering the frequency or increasing the power requirements of the torch.

Figure 1:
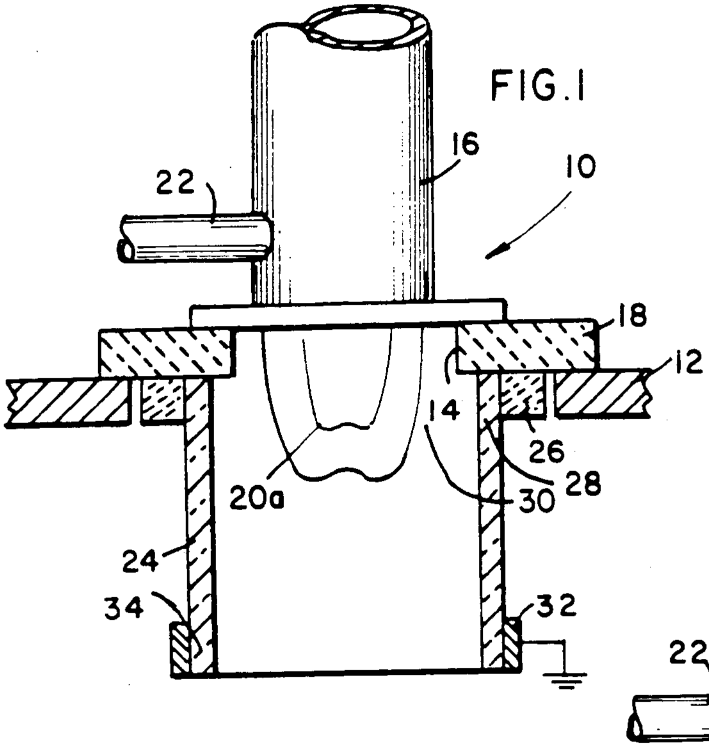
FIGS. 1 and 2 are schematic elevational views, partially in section, of a plasma torch apparatus utilizing a quartz chimney to surround the tail flame.

FIG. 1, not drawn to scale, illustrates prior art plasma generating system 10 as utilized in a spheroidization process. In FIG. 1, a spheroidization tank (not shown) is covered by conductive stainless steel cover 12 having opening 14 therein. Nozzle 16 of a "TAFA" RF plasma torch (available from TAFA, Inc., Concord, N.H.) is supported over opening 14 by electrically insulating mounting plate 18 fabricated from a heat resistant composite material. An inductive coil (not shown) above the nozzle produces a plasma from a gas fed to the torch by a gas inlet means (not shown) also above the nozzle. The plasma exits the torch at nozzle 16, entering the tank as plasma tail flame 20*a*. Metal particles are injected by probe 22 into the center of the plasma for heating to a temperature sufficient to melt and spheroidize the particles. Inlet jets (not shown) may be provided to permit sheath gas, e.g. nitrogen, to be injected to surround and aid in stabilizing tail flame 20*a*.

During the process of development leading to the present invention, attempts made to initiate a plasma flame in the apparatus illustrated in FIG. 1 failed, since the flame jumped, arcing to the stainless steel cover of the spheroidization tank, and was extinguished.

In an attempt to stabilize the flame and shield it from the metal tank cover, cylindrical chimney 24, of about 8 inches in diameter and about 15 inches in length, was fashioned from quartz tubing and was suspended from mounting plate 18, as shown in FIG. 1, by means of ring 26 of "MICOR"® insulating material (available from Mycalex Corp., Clifton, N.J.) to which proximal end 28 of chimney 22 was adhered and electrically sealed by a continuous coating of Dow Corning #997 high dielectric, high temperature transformer varnish (available from Dow Corning Corp., Midland, Mich.). Chimney 24 confined sheath gas 30 surrounding tail flame 20*a*, helping to stabilize the flame, and blocked the shorting path between flame 20*a* and tank cover 12, which had permitted the shorting that caused extinction of the flame. However a strong floating voltage was still present in the fireball and in flame 20*a*.

Figure 2:
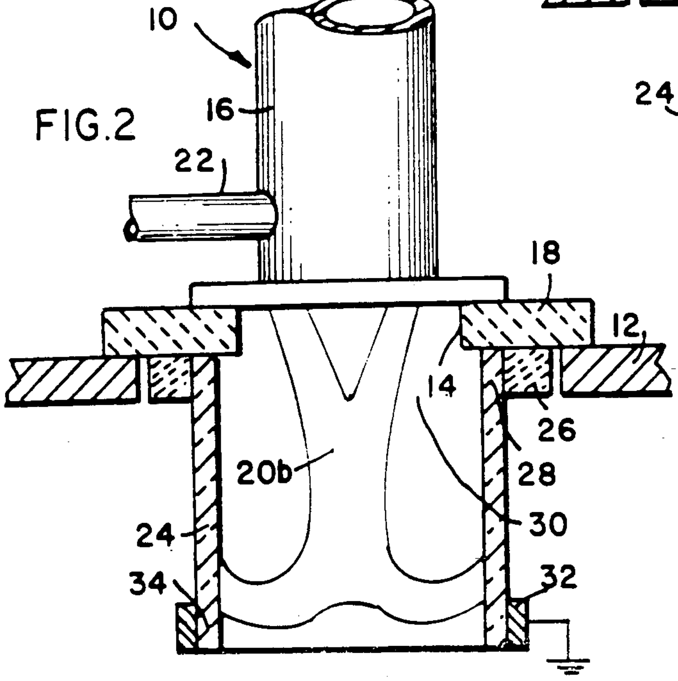

Although present, this field was not usually readily apparent in the argon flame, as shown in FIG. 1, argon being a low enthalpy (low heat content) gas. FIG. 2, in which like features are indicated by the same reference numerals, illustrates the effect of a changeover to a nitrogen feed. Nitrogen is a high enthalpy gas, having a heat capacity an order of magnitude higher than that of argon. Nitrogen thus is preferred for spheroidization processes, since it is more efficient than argon in the transfer of heat energy from the plasma to the metal particles. Nitrogen also produces a longer tail flame, increasing the residence time within the flame for spheroidization of particles. However, during conversion of the argon plasma to a nitrogen plasma, as the percent nitrogen was increased, tail flame 20*a* (FIG. 1) lengthened and became brighter, then suddenly reversed direction as shown at 20*b* in FIG. 2, "mushrooming" upward toward conductive tank cover 12 in spite of the electrical insulation provided by plate 18 and ring 26 and the shielding provided by chimney 24 and gas sheath 30. This behavior was an indication that the existing floating voltage had increased in strength as the percent nitrogen increased, until the voltage was sufficiently high to seek to strike an arc to an electrically conducting member in the system.

In an attempt to redirect tail flame 20*b* away from metal tank cover 12, strip 32 of copper braid, grounded to the bottom (not shown) of the tank, was fastened around distal end 34 of chimney 24. Again, the argon flame (FIG. 1) exhibited no visible effect from the floating voltage, but the changeover to nitrogen (FIG. 2) increased the floating voltage to the point where tail flame 20*b* mushroomed upward.

Figure 3:
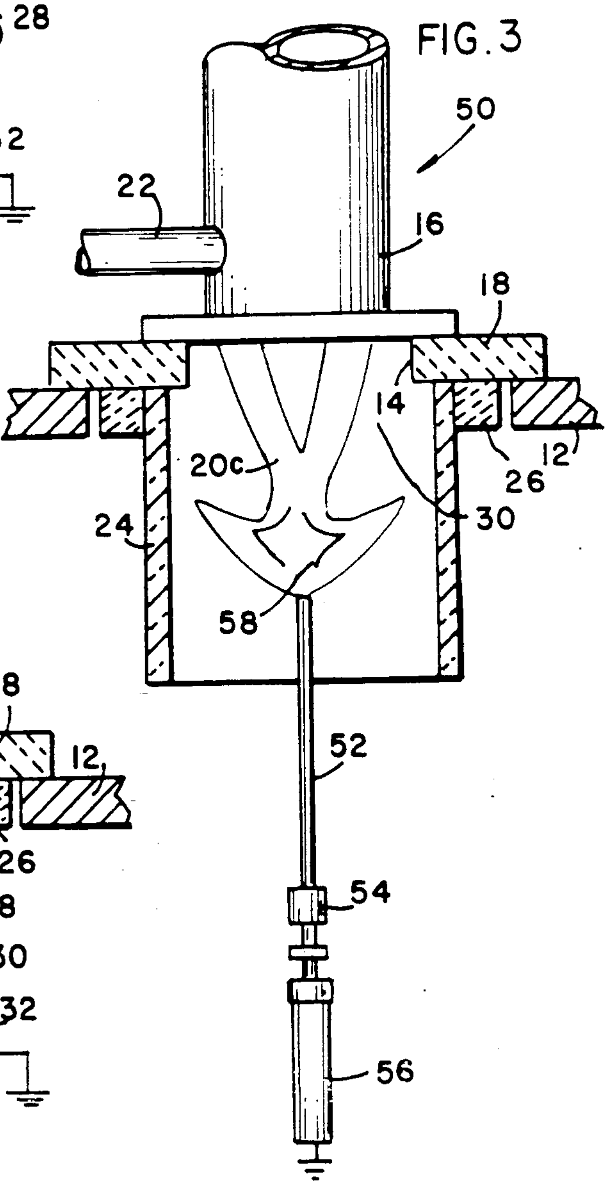
FIG. 3 is a schematic elevational view, partly in section, of the apparatus of FIGS. 1 and 2 modified according to one embodiment of the invention.

System 10 illustrated in FIGS. 1 and 2 was modified as shown in FIG. 3 to provide system 50. Like features in the FIGS. are indicated by the same reference numerals. Conductive rod 52 extends upward about 3 in into distal end 34 of chimney 24, preferably along its axis. Rod 52 as shown is of a heat resistant material, e.g. a 5/16 inch outside diameter graphite rod, although such arrangements as a water cooled copper rod are possible. Rod 52, in a preferred arrangement, is conductively connected to a less brittle material such as copper, which is in turn grounded. This is illustrated in FIG. 3, in which 5/16 inch diameter rod 52 is attached by ¼ inch compressive fitting 54 to ¼ inch o.d. OFHC (oxygen free, high conductivity) copper tubing 56. Tubing 56 is electrically connected to ground, for example by connecting tubing 56 by a compressive fitting to an aluminum channel bracket. The bracket may in turn be bolted to and in electrical contact with the spheroidization tank vacuum inlet tube, which is at ground potential. An argon plasma was generated in this modified system producing, as before modification, a "well-behaved" tail flame. With the argon feed gas, the power level was increased until arc 58 was initiated between tail flame 20*c* and grounded rod 52. Arc 58 did not appear to initiate at nozzle 16, but within flame 20*c*. The Table below shows the values of the plate current and voltage and the grid current (all of the RF generator) at flame initiation, flame initiation indicating generation of a plasma in the argon, and just before and after formation of arc 58.

TABLE

| | (1) At Flame Initiation | (2) Just Before Arc Struck | (3) After Arc Struck |
|---|---|---|---|
| Plate Current, A | 6.5 | 8 | 10 |
| Plate Voltage, KV | 6 | ≈7 | 7 |
| Grid Current, A | 1.1 | | 0.8 |

As shown in the Table, the most notable effect of the striking of arc 48 was the decrease in the grid current. The plate current increased at arc initiation, but the voltage did not significantly change. Thus, it may be seen that the modification of the system by providing a grounded electrode below the nozzle eliminated the arcing problems described above, with the added advantage of an increase in the efficiency of the torch, i.e. in the usable energy transferred to the gas.

Figure 4:
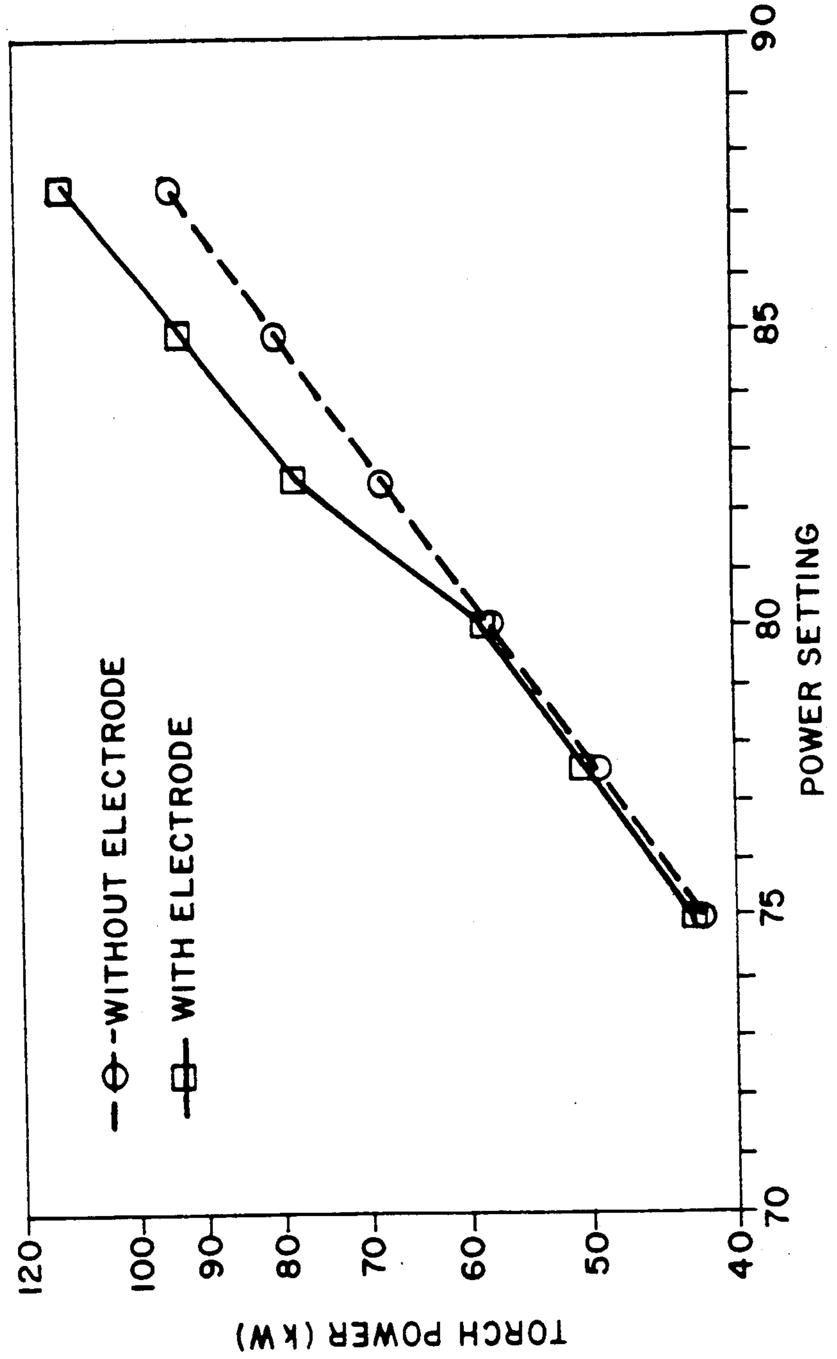
FIG. 4 is a graphical representation of the effect of one embodiment of the invention on the RF torch power.

When the system underwent a changeover to nitrogen, arc 58 between flame 20*c* and rod 52 assumed a similar shape to that produced by the argon flame. The arc appeared to originate within the torch, and appeared to "dance" at nozzle 16 and within flame 20*c*. The effect of the electrode on the torch power is shown in FIG. 4, which is a graphical representation of the increase in torch power with the power setting on the torch for a system without the graphite grounding rod and with the rod. FIG. 4 shows a significant increase in efficiency of the torch with the use of the grounding rod.

Although the system described above includes specifically described features, alternatives may be substituted and are within the scope of the present invention. For example, any electrically insulating, rigid, preferably transparent, material may be substituted for the quartz tubing used for the chimney. Other heat resistant, electrically insulating materials may be substituted for the MICOR components. Alternative conducting materials, highly heat resistant or adapted to be so for the grounded electrode, and less heat resistant for the members associated therewith, may be used to provide a preferred path to ground for the anomalous floating voltage.

The prior art has not recognized that the anomalous voltage can be utilized productively. Conventional wisdom characterizes this anomalous voltage as a nuisance to be avoided or isolated, and attention has been focused exclusively on such considerations. Prior to the present invention, the potential for greater energy efficiency and improved spatial distribution in RF plasma generators have not been recognized. The novel system and method described herein prevents unwanted arcing, with its likelihood of quenching the flame, and increases the efficiency of the torch. The described system and method provide an improved plasma flame similar to that achieved with the abovedescribed hybrid plasma systems in a far less complex and more economical manner.

While there have been shown and described what are at present considered the preferred aspects of the invention, it will be obvious to those skilled in the art that various changes and modifications can be made therein without departing from the scope of the invention as defined by the appended claims.

We claim:

1. An inductively coupled RF plasma generator comprising:

- a body including a conduit for the passage of a gas through said body, said conduit having an inlet for introducing said gas to said conduit and an outlet;
- induction means associated with a plasma generating region of said conduit for inductively exciting said gas to generate a plasma from said gas, said plasma exiting said conduit at said outlet as a tail flame;
- electrically insulating chimney means having an open proximal end positioned at said outlet such that said chimney surrounds said tail flame and no electrical path to ground exists between said outlet and said chimney means, and an open distal end; and
- a grounded electrode positioned downstream of said plasma generating region and sufficiently near to said outlet to provide an electrical path to ground from said tail flame which is shorter than other available paths to ground.

2. An RF plasma generator in accordance with claim 1 wherein said chimney means comprises a transparent quartz cylinder.

3. An RF plasma generator in accordance with claim 1 further comprising means for providing a sheath of flowing gas between said tail flame and said chimney means.

4. A device for modifying an inductively coupled RF plasma generator comprising a body including a conduit for the passage of a gas through said body, said conduit having an inlet for introducing said gas to said conduit and an outlet, and induction means associated with a plasma generating region of said conduit for inductively exciting said gas to generate a plasma from said gas, said plasma exiting said conduit at said outlet as a tail flame, said device comprising:

- electrically insulating chimney means having an open proximal end positionable at said outlet such that said chimney surrounds said tail flame and no electrical path to ground exists between said outlet and said chimney means, and an open distal end; and
- a grounded electrode associated with said chimney means such that said grounded electrode is positionable downstream of said plasma generating region and sufficiently near to said outlet to provide an electrical path to ground from said tail flame which is shorter than other available paths to ground.

5. A device in accordance with claim 4 wherein said chimney means comprises a transparent quartz cylinder.

6. A method for generating a plasma utilizing an inductively coupled RF plasma generator comprising a body including a conduit for the passage of a gas through said body, said conduit having an inlet for introducing said gas to said conduit and an outlet, and induction means associated with a plasma generating region of said conduit for inductively exciting said gas to generate a plasma from said gas, said plasma exiting said conduit at said outlet as a tail flame, said method comprising the steps of:

- introducing a gas to said conduit at said inlet;
- inductively exciting said gas within said conduit, by means of said induction coil, to generate a plasma from said gas, said plasma exiting said conduit at said outlet as a tail flame;
- surrounding said tail flame with an electrically insulating chimney means having an open proximal end and an open distal end, such that no electrical path to ground exists between said outlet and said chimney means; and
- positioning a grounded electrode downstream of said plasma generating region and sufficiently near to said outlet to provide an electrical path to ground which is shorter than other available paths to ground.

7. A method of modifying an inductively coupled RF plasma generator comprising a body including a conduit for the passage of a gas through said body, said conduit having an inlet for introducing said gas to said conduit and an outlet, and induction means associated with a plasma generating region of said conduit for inductively exciting said gas to generate a plasma from said gas, said plasma exiting said conduit at said outlet as a tail flame, said method comprising the steps of:

- positioning at said outlet to surround said tail flame an electrically insulating chimney means having an open proximal end and an open distal end, such that no electrical path to ground exists between said outlet and said chimney means; and
- positioning a grounded electrode downstream of said plasma generating region and sufficiently near to said outlet to provide an electrical path to ground which is shorter than other available paths to ground.

* * * * *